US011858644B2

(12) United States Patent
Goraj et al.

(10) Patent No.: US 11,858,644 B2
(45) Date of Patent: Jan. 2, 2024

(54) DRIVE DEVICE FOR AN AIRCRAFT WITH ELECTRIC MACHINE AND COOLING DEVICE

(71) Applicant: Rolls-Royce Deutschland Ltd & Co KG, Blankenfelde-Mahlow (DE)

(72) Inventors: Robert Goraj, Erlangen (DE); Heintje Wyczisk, Erlangen (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 818 days.

(21) Appl. No.: 16/968,559

(22) PCT Filed: Feb. 1, 2019

(86) PCT No.: PCT/EP2019/052474
§ 371 (c)(1),
(2) Date: Aug. 7, 2020

(87) PCT Pub. No.: WO2019/158373
PCT Pub. Date: Aug. 22, 2019

(65) Prior Publication Data
US 2021/0039797 A1 Feb. 11, 2021

(30) Foreign Application Priority Data
Feb. 13, 2018 (DE) ...................... 10 2018 202 172.4

(51) Int. Cl.
*B64D 27/24* (2006.01)
*H02K 9/19* (2006.01)
(Continued)

(52) U.S. Cl.
CPC ............... *B64D 27/24* (2013.01); *H02K 1/20* (2013.01); *H02K 5/203* (2021.01); *H02K 9/14* (2013.01); *H02K 9/19* (2013.01)

(58) Field of Classification Search
CPC .......... B64D 27/24; H02K 1/20; H02K 5/203; H02K 9/14; H02K 9/19
(Continued)

(56) References Cited

U.S. PATENT DOCUMENTS 4,352,034 A * 9/1982 Karhan ..................... H02K 1/20
310/55
2015/0035392 A1 2/2015 Pal
(Continued)

FOREIGN PATENT DOCUMENTS

DE 4411055 A1 8/1995
DE 102010048131 A1 4/2012
(Continued)

OTHER PUBLICATIONS

German Search Report for German Application No. 10 2018 202 172.4 dated Jan. 24, 2019.
(Continued)

*Primary Examiner* — Rashad H Johnson
(74) *Attorney, Agent, or Firm* — Lempia Summerfield Katz LLC

(57) ABSTRACT

The invention relates to a drive device (1) for an aircraft, comprising: an electric machine (2) with a stator (3) and a rotor (4) and a cooling device (10) for cooling the electric machine (2), the cooling device (10) having an encapsulated first cooling region (12), in which a first cooling liquid for cooling the stator (3) and/or the rotor (4) is disposed, the cooling device (10) having a second cooling region (15), which is separate from the first cooling region (12) and in which the second liquid is disposed, and the cooling device (10) having an internal heat exchanger (11) for transmitting heat from the first cooling liquid to the second cooling liquid.

14 Claims, 1 Drawing Sheet

(51) Int. Cl.
*H02K 5/20* (2006.01)
*H02K 1/20* (2006.01)
*H02K 9/14* (2006.01)

(58) Field of Classification Search
USPC ........................................ 310/52, 54, 58, 64
See application file for complete search history.

(56) References Cited

U.S. PATENT DOCUMENTS

2018/0087809 A1* 3/2018 Ueda ...................... F25J 1/0284
2019/0032967 A1* 1/2019 Bhatia ....................... F25B 1/04

FOREIGN PATENT DOCUMENTS

| DE | 102011084038 A1 | 11/2012 |
| DE | 102012019749 A1 | 4/2014 |
| DE | 102015204984 A1 | 10/2016 |
| DE | 102016214405 A1 | 2/2018 |
| EP | 2784919 A2 | 10/2014 |

OTHER PUBLICATIONS

International Search Report and the Written Opinion for International Patent Application PCT/EP2019/052474 dated May 16, 2019.

* cited by examiner

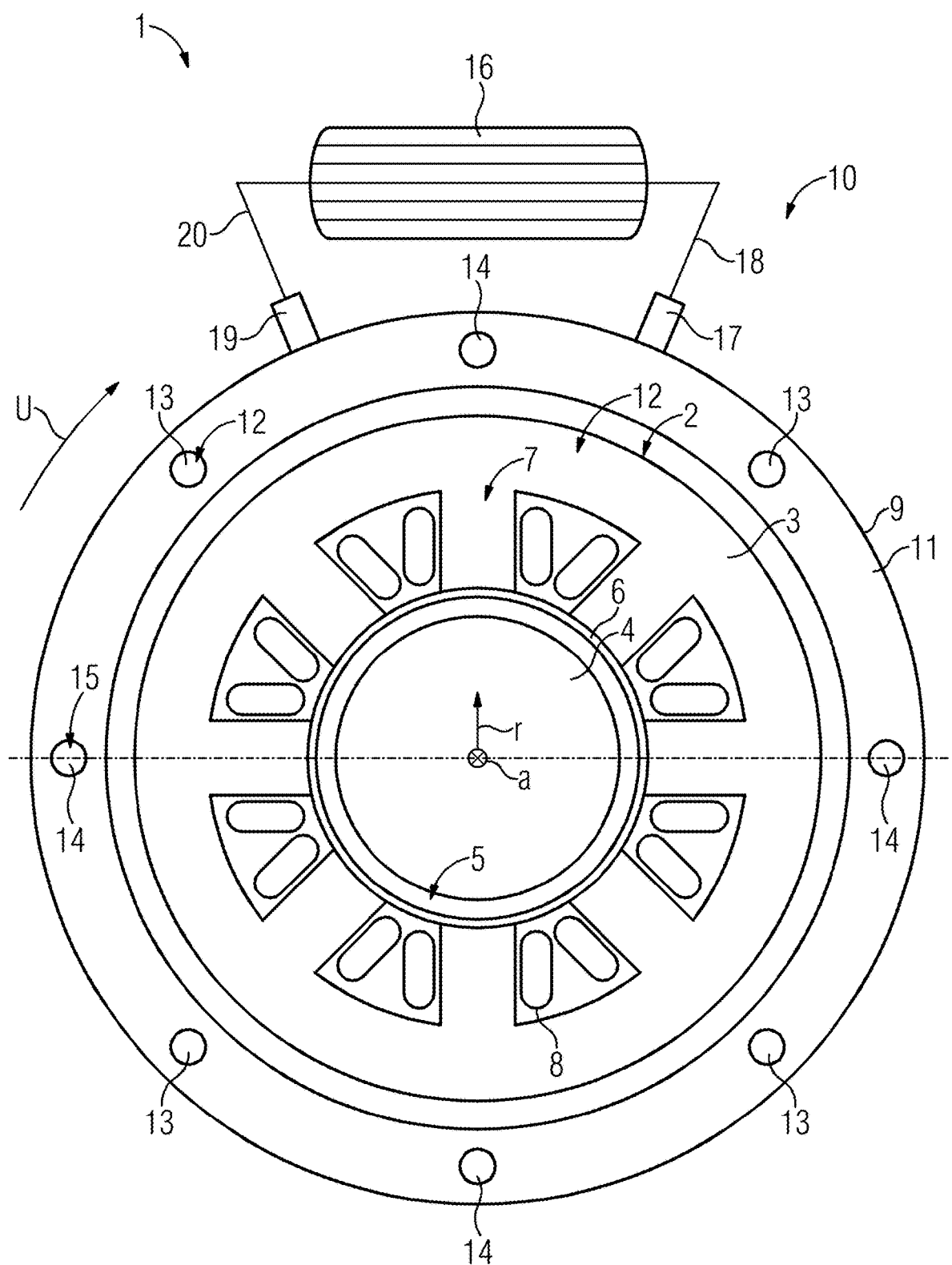

DRIVE DEVICE FOR AN AIRCRAFT WITH ELECTRIC MACHINE AND COOLING DEVICE

This application is the National Stage of International Application No. PCT/EP2019/052474, filed Feb. 1, 2019, which claims the benefit of German Patent Application No. DE 10 2018 202 172.4, filed Feb. 13, 2018. The entire contents of these documents are hereby incorporated herein by reference.

BACKGROUND

The present embodiments relate to a drive device for an aircraft.

Aircraft that are operated by an electric drive device are known from the prior art. A drive device of this type includes an electric machine and a cooling device for cooling the electric machine. In this case, the electric machines are cooled directly or indirectly using, for example, combustible liquids. These combustible liquids represent a potential fire hazard in terms of the fire load of the liquid and the design used. After the combustible liquid, which is used as a cooling liquid, has absorbed the heat inside the electric machine, the liquid is cooled down to the desired working temperature outside the electric machine by an externally installed heat exchanger.

In the aviation industry, an assessment is to be carried out in terms of, for example, safety as to the extent to which the amount of a combustible liquid and the physical transportation thereof may lead to a risk in the corresponding application. In addition, a check is to be carried out as to whether this may lead to a corresponding classification or risk rating of the intended installation space. For example, a space of this type may then be classified as a designated fire zone (DFZ). The combustible liquid is assessed according to aviation design specifications, and corresponding design measures are taken to rate and reduce the risk.

Previously, in the case of conventional combustion technology, this problem was solved in that specific design measures were taken, in that the installation location was declared to be a DFZ, and all the components installed therein had to meet higher requirements with respect to fire safety. This provides, for example, that all the components therein are to remain fully functional at a temperature of 2000° F. for a duration of 15 minutes. However, this leads to a design solution that is elaborate in multiple aspects.

The use of electric machines and electric motors as primary drive systems in aviation has not been established previously. Therefore, there is currently no solution, since this problem did not exist previously. For the purpose of simplifying the requirements for the new technology base, it is necessary to simplify design solutions in order to firstly achieve an improvement over conventional technology and secondly provide the advantages of the technology when integrating the technology into the new domain of aviation.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a drive device for an aircraft that may be operated more safely in a simple manner is provided.

A drive device according to the present embodiments for an aircraft includes an electric machine having a stator and a rotor. The drive device includes a cooling device for cooling the electric machine. In this case, the cooling device has an enclosed first cooling region in which a first cooling liquid for cooling the stator and/or the rotor is located. The cooling device includes a second cooling region that is separate from the first cooling region and in which a second cooling liquid is located. The cooling device has an internal heat exchanger for transferring heat from the first cooling liquid to the second cooling liquid.

The drive device may be used in an aircraft (e.g., an airplane) that is powered by electricity. By way of example, the drive device may be used in an electric airplane. The electric machine of the drive device may be used, for example, to drive a turbine or a propeller of the aircraft. The electric machine includes the stator and the rotor, which may be configured to be, for example, rotatable relative to the stator. For example, the rotor is formed internally within the stator. The cooling device of the drive device is used to cool the electric machine during operation. For example, the cooling device is used to cool windings of the stator.

In this case, the cooling device has an enclosed first cooling region in which the first cooling liquid is located. This first cooling liquid may be, for example, a combustible cooling liquid. Using the first cooling liquid, the stator of the electric machine, for example, is cooled during operation. In this case, this stator may include corresponding windings in which operation-related power losses occur. These losses are converted into heat that may be conducted away by the first cooling liquid. The first cooling region in which the first cooling liquid is located may have a corresponding wall. This wall may be produced, for example, from a metal. The first cooling region may include one or more cavities in which the first cooling liquid is located. The first cooling region may also include one or more cooling channels. For example, the first cooling region is configured to be liquid-tight or tight for the first cooling liquid. The first cooling liquid, which is, for example, combustible, is thus located in a closed space and, for example, is not used outside the electric machine. This reduces the potential risk. Additionally, the cooling device includes the internal heat exchanger, by which the heat may be transferred from the first cooling liquid to the second cooling liquid. The heat exchanger is thus, for example, in the form of a fluid-to-fluid heat exchanger. The second cooling liquid is located in a second cooling region that is formed separately from the first cooling region. The fluid-to-fluid heat exchanger used thus consists of two separate, independent chamber systems so that the two cooling liquids used are not in direct contact with one another. Thus, reliable cooling of the electric machine may be achieved in a simple manner overall.

In one embodiment, the first cooling liquid is a combustible liquid, and the second cooling liquid is a non-combustible liquid. The first cooling liquid may be, for example, a corresponding oil. The second cooling liquid may be water or a water/glycol mixture. With the cooling device used in the present case, the first, combustible liquid remains enclosed in the first cooling region. The second cooling liquid, which is non-combustible, may also be used outside the electric machine or conducted outside the electric machine. A new type of cooling device that allows an enclosed application of a combustible cooling liquid or of the first cooling liquid may thus be provided. In this way, the aviation requirements may be met.

In one embodiment, the internal heat exchanger is arranged inside a housing of the electric machine. In this case, it is provided, for example, that the stator and the rotor are arranged inside the housing. The housing may be formed, for example, so as to be closed and thus so as to seal the stator and the rotor against external environmental influences. Parts of the housing may also be used to transmit the torque generated by the electric machine. If the internal heat exchanger is arranged inside the housing of the electric machine, it may be provided that the combustible cooling liquid or the first cooling liquid remains inside the housing. Safety during the operation of the electric machine or of the drive device may thus be increased.

In one embodiment, the stator has a laminated core, and the internal heat exchanger is arranged on the laminated core. The winding or coils of the winding may be arranged on the laminated core of the stator. The coils may be arranged on teeth of the stator or of the laminated core. In this case, it is provided, for example, that the internal heat exchanger surrounds the laminated core in the circumferential direction at least in some regions. In one embodiment, the internal heat exchanger is formed in the manner of a cooling jacket. In this way, the heat generated on the stator during the operation of the electric machine may be conducted away effectively.

In another embodiment, the electric machine includes a split tube between the stator and the rotor, and the first cooling region extends from the split tube to a wall of the heat exchanger. The split tube may be substantially in the form of a hollow cylinder and may be arranged in the gap between the stator and the rotor. As already explained, the internal heat exchanger may surround the stator in the circumferential direction at least in some regions. The first cooling region may thus extend from the split tube to a wall of the heat exchanger that faces the split tube or the stator. This produces an enclosed region that forms the first cooling region or part of the first cooling region. Thus, for example, the heat may be transported away from the stator effectively.

In another embodiment, the internal heat exchanger is arranged on an outer face of a housing of the electric machine. For example, the internal heat exchanger may surround the housing at least in some regions. In principle, it is provided that the location of the housing of the electric machine and of the internal heat exchanger may also be varied according to the design requirements as desired in terms of order and arrangement. The cooling device may thus be adapted to the configuration of the electric machine.

In another embodiment, the cooling device includes an external heat exchanger for cooling the second cooling liquid. The cooling device may thus have an additional heat exchanger or the external heat exchanger that is located, for example, outside the housing of the electric machine. If the heat has been transferred from the first cooling liquid to the second cooling liquid by the internal heat exchanger, the second cooling liquid may accordingly be cooled down again by the external heat exchanger. By way of example, the internal heat exchanger may include a corresponding inlet, via which the second cooling liquid cooled down by the external heat exchanger reaches the internal heat exchanger. The internal heat exchanger may include a corresponding outlet, via which the heated second cooling liquid may be transferred to the external heat exchanger. The internal heat exchanger and the external heat exchanger may be interconnected by corresponding lines or tubes. In this case, it is provided, for example, that the external heat exchanger is located in a well ventilated region or space in the aircraft. This allows effective operation of the cooling device.

According to another embodiment, it may be provided that the cooling device and/or the electric machine are configured such that the heated second cooling liquid transports the heat away to the outside via the housing of the electric machine or via the housing of the heat exchanger. By way of example, it may be provided that the electric machine or the housing of the electric machine includes corresponding cooling ribs to transport away the heat of the second cooling liquid. It may also be provided that one part of the heat of the second cooling liquid is conducted away via the housing, and another part of the heat is transferred to the external heat exchanger in order to cool down the second cooling liquid.

In another embodiment, the cooling device is configured such that, during the operation of the electric machine, the first cooling liquid has a higher temperature by comparison with the second cooling liquid. The internal heat exchanger and optionally the external heat exchanger may thus be dimensioned and/or operated such that the first cooling liquid has a higher temperature than the second cooling liquid. This results in heat being transported between the combustible first cooling liquid and the non-combustible second cooling liquid. The heat produced during the operation of the electric machine may thus be conducted away particularly effectively.

In one embodiment, the internal heat exchanger may be produced by an additive manufacturing process. By way of example, the internal heat exchanger may be produced by a 3D-printing process. Using additive manufacturing processes provides that it is possible to produce the heat exchanger in complex geometrical shapes. The shape of the internal heat exchanger may be configured so as to optimize the heat transfer. New material combinations may be provided. By using additive manufacturing processes for the fluid-to-fluid heat exchanger, the same heat transfer coefficients as for the mechanical interfaces may be achieved. Using the additive manufacturing process, the internal heat exchanger may be produced such that the heat exchanger has high transfer of heat but low additional weight. The connections for the cooling liquids and the inlet and the outlet for the external heat exchanger may have variable designs. The connections may extend in a radial direction or in an axial direction of the electric machine. It is made possible to produce a redundant cooling system. By a suitable construction, it is also possible to achieve cooling of the teeth of the stator (e.g., by the cooler second cooling liquid).

In another embodiment, the electric machine is in the form of a permanently excited synchronous machine including surface magnets. An electric machine configured in this manner is particularly low maintenance and produces sufficient torque to drive the electrically powered aircraft.

An aircraft according to the present embodiments includes a drive device according to the present embodiments. The aircraft may be, for example, in the form of an electric airplane. The aircraft may also be powered at least partially by electricity. The aircraft may also be, for example, a helicopter or the like. If the drive device includes the external heat exchanger, it is provided, for example, that the heat exchanger is arranged on a region of the aircraft in which a cooling air stream may flow around the heat exchanger. By way of example, the external heat exchanger may be arranged in a well ventilated space and/or a well ventilated region of the aircraft.

The embodiments presented with reference to the drive device and the advantages thereof apply correspondingly to the aircraft according to the present embodiments.

Further features of the invention may be found in the claims, the drawings, and the description of the drawings. The features and combinations of features cited above in the description and the features and combinations of features cited below in the description of the drawing and/or shown in isolation in the drawing may be used not only in the combination indicated in each case, but also in other combinations, without departing from the scope of the invention.

BRIEF DESCRIPTION OF THE DRAWING

FIG. 1 is a schematic view of one embodiment of a drive device.

DETAILED DESCRIPTION

FIG. 1 is a sectional view of a drive device 1 according to one embodiment. The drive device 1 includes an electric machine 2. This electric machine 2 includes a stator 3 and a rotor 4. In the embodiment shown, the rotor 4 is formed internally and so as to be rotatable relative to the stator 3. A gap 5 is formed between the stator 3 and the rotor 4. In this gap 5, there is a split tube 6 that may be in the form of a hollow cylinder. The stator 3 of the electric machine 2 includes a laminated core 7, on which coils 8 of a winding of the electric machine 2 are arranged. The electric machine 2 may, for example, be in the form of a permanently excited synchronous machine including surface magnets. In this case, the surface magnets or the permanent magnets are arranged on the rotor 4. The electric machine 2 also includes a housing 9.

The drive device 1 includes a cooling device 10. The cooling device 10 includes an internal heat exchanger 11 that is used to transfer the heat from a first cooling liquid to a second cooling liquid. In this case, the first cooling liquid is located in a first cooling region 12. In the present case, the first cooling region 12 extends from the split tube 6 to a wall 13 of the internal heat exchanger 11. The first cooling region 12 includes corresponding cooling channels 13, in which the first cooling liquid is located. During operation of the electric machine 2, the stator 3 of the electric machine 2 and, for example, the windings 8 thereof warm up. As a result, the first cooling liquid also warms up. The first cooling liquid is a combustible cooling liquid. The first cooling liquid is then conducted from the region between the split tube 6 and the wall 13 of the internal heat exchanger 11 into the cooling channels 13, which extend along an axial direction a of the electric machine 2 and are part of the internal heat exchanger 11.

The internal heat exchanger 11 includes additional cooling channels 14 that likewise extend in the axial direction a and are assigned to a second cooling region 15 or form the second cooling region 15. The second cooling liquid is a non-combustible cooling liquid (e.g., a mixture of water and glycol). In the present case, the cooling channels 13, in which the first cooling liquid flows, and the cooling channels 14, in which the second cooling liquid flows, are arranged so as to alternate with one another along a circumferential direction U of the electric machine 2.

The internal heat exchanger 11 is in the form of a fluid-to-fluid heat exchanger and includes two separate, independent chamber systems (e.g., the first cooling region 12 and the second cooling region 15). The first cooling region 12 and the second cooling region 15 are formed such that the first cooling liquid and the second cooling liquid are not in direct contact with one another. As a result, the internally used combustible liquid or the first cooling liquid is cooled by the walls of the heat exchanger 11 by the non-combustible liquid or the second cooling liquid. In this case, the temperature of the second cooling liquid is higher than the temperature of the first cooling liquid. This results in heat being transported between the first cooling liquid and the second cooling liquid.

The cooling device 10 includes an external heat exchanger 16 that is located outside the housing 9 of the electric machine 2. The external heat exchanger 16 is used to cool the second cooling liquid. The internal heat exchanger 11 includes an outlet 17 through which the heated second cooling liquid exits. The outlet 17 is connected to the external heat exchanger 16 by a tube 18 or a line. The internal heat exchanger 11 includes an inlet 19, through which the second cooling liquid reaches the internal heat exchanger 11. The outlet 19 is connected to the external heat exchanger 16 by a tube 20 or a line. In this case, the external heat exchanger 16 is, for example, located in a well ventilated or cooled region of the aircraft.

In the case of the cooling device 10, the first cooling liquid or the combustible liquid thus remains enclosed in a space between the split tube 6 and the walls 13 of the internal heat exchanger 11. The fire hazard is thus reduced as a result of the reduced amount of combustible liquid. Using the internal heat exchanger 11 or the fluid-to-fluid heat exchanger, the hazardous amounts of cooling media or cooling liquids used are reduced. This results in easy handling at the interface to the external heat exchanger 16, which is operated with the non-combustible liquid or the second cooling liquid. In principle, it may be provided that the internal heat exchanger 11 and the housing 9 may be arranged in a radial direction r of the electric machine 2 in any order.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A drive device for an aircraft, the drive device comprising:
   an electric machine having a stator and a rotor; and
   a cooling device operable to cool the electric machine,
      wherein the cooling device has an enclosed first cooling region in which a first cooling liquid for cooling the stator, the rotor, or the stator and the rotor is located,
      wherein the cooling device has a second cooling region that is separate from the first cooling region and in which a second cooling liquid is located,
      wherein the cooling device includes an internal heat exchanger operable to transfer heat from the first cooling liquid to the second cooling liquid,
      wherein the internal heat exchanger is arranged inside a housing of the electric machine, and wherein the electric machine includes a split tube between the stator and the rotor, and the first cooling region extends from the split tube to a wall of the internal heat exchanger.

2. The drive device of claim 1, wherein the first cooling liquid is a combustible liquid, and the second cooling liquid is a non-combustible liquid.

3. The drive device of claim 1, wherein the stator has a laminated core, and the internal heat exchanger is arranged on the laminated core.

4. The drive device of claim 1, wherein the cooling device further comprises an external heat exchanger operable to cool the second cooling liquid.

5. The drive device of claim 1, wherein the cooling device is configured such that, during operation of the electric machine, the first cooling liquid has a higher temperature with compared to the second cooling liquid.

6. The drive device of claim 1, wherein the internal heat exchanger is an additive manufactured heat exchanger.

7. The drive device of claim 1, wherein the electric machine is in the form of a permanently excited synchronous machine comprising surface magnets.

8. An aircraft comprising:
a drive device comprising:
an electric machine having a stator and a rotor; and
a cooling device operable to cool the electric machine,
wherein the cooling device has an enclosed first cooling region in which a first cooling liquid for cooling the stator, the rotor, or the stator and the rotor is located,
wherein the cooling device has a second cooling region that is separate from the first cooling region and in which a second cooling liquid is located,
wherein the cooling device includes an internal heat exchanger operable to transfer heat from the first cooling liquid to the second cooling liquid,
wherein the internal heat exchanger is arranged inside a housing of the electric machine, and
wherein the electric machine includes a split tube between the stator and the rotor, and the first cooling region extends from the split tube to a wall of the internal heat exchanger.

9. The aircraft of claim 8, wherein the first cooling liquid is a combustible liquid, and the second cooling liquid is a non-combustible liquid.

10. The aircraft of claim 8, wherein the stator has a laminated core, and the internal heat exchanger is arranged on the laminated core.

11. The aircraft of claim 8, wherein the cooling device further comprises an external heat exchanger operable to cool the second cooling liquid.

12. The aircraft of claim 8, wherein the cooling device is configured such that, during operation of the electric machine, the first cooling liquid has a higher temperature compared to the second cooling liquid.

13. The aircraft of claim 8, wherein the internal heat exchanger is an additive manufactured heat exchanger.

14. The aircraft of claim 8, wherein the electric machine is in the form of a permanently excited synchronous machine comprising surface magnets.

* * * * *